May 23, 1967     C. E. EVEREST     3,321,766
CLOSED-LOOP GALVANOMETER SERVO SYSTEM
Original Filed April 24, 1964
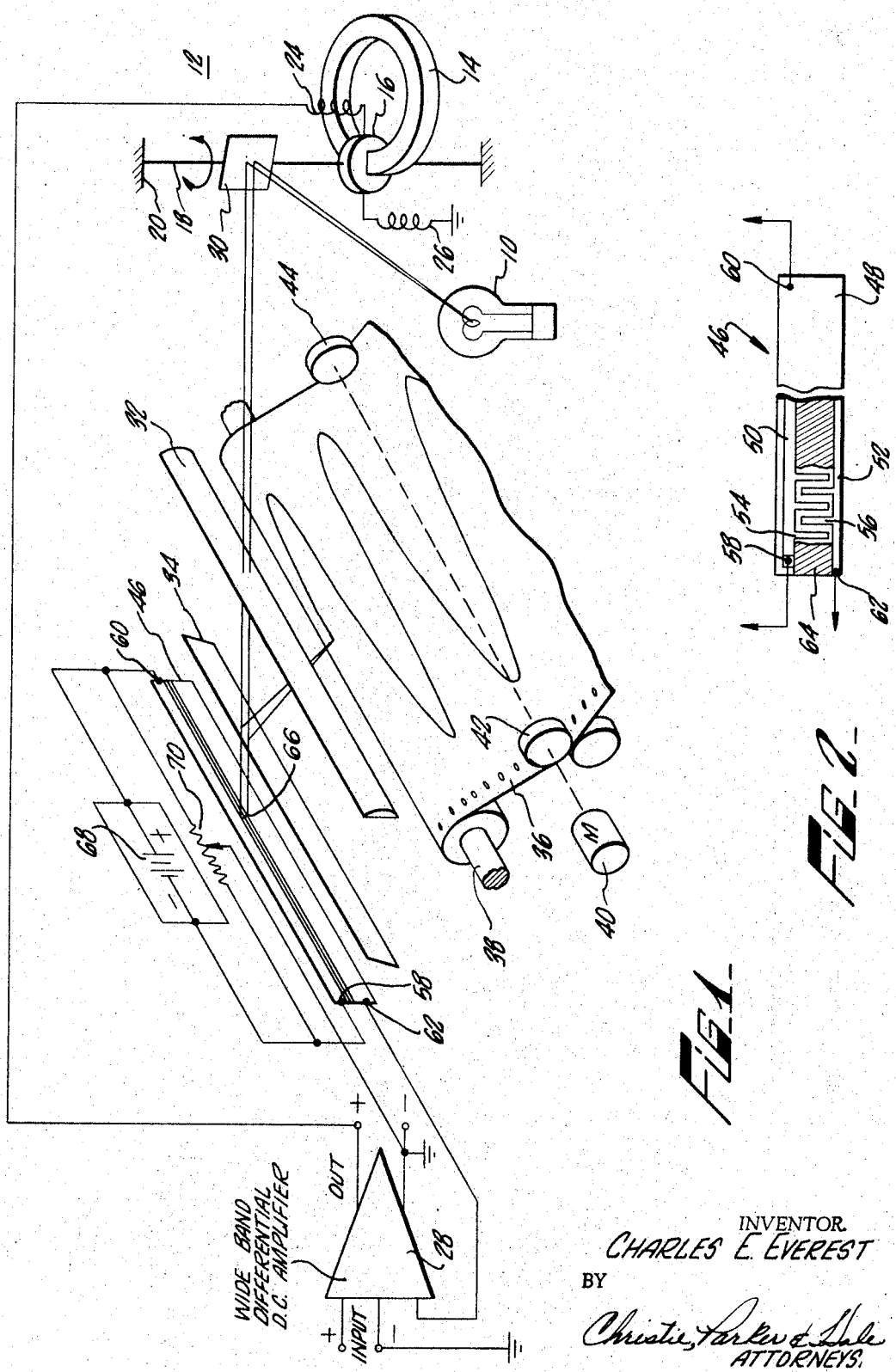
INVENTOR.
CHARLES E. EVEREST
BY
Christie, Parker & Hale
ATTORNEYS.

United States Patent Office 3,321,766
Patented May 23, 1967

3,321,766
CLOSED-LOOP GALVANOMETER SERVO SYSTEM
Charles E. Everest, Palos Verdes Peninsula, Calif., assignor to Consolidated Electrodynamics Corporation, Pasadena, Calif., a corporation of California
Continuation of application Ser. No. 362,354, Apr. 24, 1964. This application June 8, 1966, Ser. No. 562,037
3 Claims. (Cl. 346—32)

This application is a continuation of my copending application Ser. No. 362,354, filed Apr. 24, 1964, and now abandoned.

This invention relates to recording oscillographs and, more particularly, is concerned with a closed-loop servo system for controlling the angular position of a galvanometer in response to an input signal.

Recording oscillographs, utilizing galvanometer units, are well known. The galvanometer unit has a moving coil on which is mounted a mirror for deflecting a light beam by varying amounts in response to changes in the angular position of the moving coil of the galvanometer. The light beam reflected off the mirror scans the surface of a moving recording strip sensitive to the light beam. Thus, an image is produced on the recording strip graphically illustrating the changes in the angular position of the galvanometer in response to an input signal being measured.

In such recording oscillograph arrangements heretofore employing a galvanometer element, the moving coil of the galvanometer is supported by spring means which counteracts the torque produced on the moving coil of the galvanometer in response to the applied signal. The larger the signal applied to the galvanometer, the greater the torque produced by the moving coil element and the greater the angular deflection of the moving coil element against the resistance or restoring effort of the spring mounting of the coil element.

In such systems, performance characteristics such as linearity and frequency response are limited by the design of the galvanometer. In order to improve the frequency response, the inertia of the moving coil element of the galvanometer must be reduced to an absolute minimum. This means that the coil element must be made extremely small and the associated beam deflecting mirror likewise must be made extremely small. Of course the smaller the mirror, the less light energy which can be reflected from the surface of the mirror, and the more sophisticated the optical system must be to concentrate the light in as narrow a beam as possible to obtain sufficient light intensity reflected off the small mirror surface to record a clear image on the recording medium.

Linearity of the galvanometer unit requires extremely careful design of the field magnet, the coil element and the spring assembly in order to get substantially uniform increments of deflection over the full angular range of the galvanometer unit.

The present invention provides a recording oscillograph using a light beam deflecting galvanometer system which provides greatly improved performance characteristics over conventional recording oscillograph systems of the type described above. In particular, the present invention provides a closed-loop servo system controlling the galvanometer, permitting a larger galvanometer moment of inertia for a given frequency response. By permitting a larger moment of inertia, the mirror can be made larger to provide greater optical efficiency and utilize a less intense and therefore less expensive light source. By having a larger moving coil element, a much less expensive galvanometer can be employed with greatly lowered sensitivity requirements. At the same time, the present invention provides a galvanometer type recording oscillograph which has improved linearity and does not require temperature control to eliminate drift and to maintain calibration.

In brief, the recording system of the present invention provides means for producing a visual record of variations in amplitude of an input voltage. The system includes a galvanometer having a moving coil element and a mirror mounted on the moving coil element. A source of light directs a beam onto the mirror, the mirror reflecting the beam and causing the beam to scan along a linear path as the moving coil is angularly deflected by an impressed voltage. A portion of the reflected beam is directed onto an electro-optical potentiometer unit which includes an elongated resistance element. The electro-optical potentiometer unit in addition includes a conductive element and photosensitive material responsive to light for making a low resistance path between the conductive element and the resistance element at the point of the impinging light beam. A fixed voltage is applied across the resistance element, so that a varying voltage is derived from the conductive element as the position of the light beam is varied. The galvanometer is driven in response to the voltage difference between the input voltage signal and the voltage derived from the conductive element of the electro-optical potentiometer unit. Means is provided for driving a continuous strip of a recording medium sensitive to the light beam and a portion of the beam reflected from the mirror is simultaneously directed onto the recording medium and the photosensitive material of the electro-optical potentiometer for sensing and simultaneously recording the position of the reflected beam from the galvanometer mirror.

For a more complete understanding of the invention, reference should be made to the accompanying drawings, wherein:

FIGURE 1 is a schematic diagram of a recording oscillograph embodying the invention; and FIGURE 2 is a plan view showing details of a suitable electro-optical sensing unit used in the recording system.

Referring to the drawings in detail and particularly to FIGURE 1, the numeral 10 indicates generally a light source which may, for example, be an incandescent lamp which radiates light energy over the entire visible spectrum. Light from the source 10 is directed to a galvanometer unit, indicated generally at 12, which may be of a type described in Patent No. 2,550,720. The galvanometer includes a permanent magnet 14 for producing a magnetic field in which a moving coil 16 is permitted to rotate. The moving coil 16 is suspended on a torsion spring 18 extending between two spaced support points indicated at 20 and 22. The moving coil 16 is provided with a pair of connecting leads 24 and 26 by which the moving coil is connected to the output of a wide band differential D.C. amplifier 28. The lead 26 is preferably connected to reference ground potential.

An output signal from the amplifier 28 provides a current flow through the moving coil 16, resulting in a torque on the moving coil. The deflection of the moving coil causes rotation of a mirror 30. Light from the source 10 which falls on the mirror 30 is reflected off at an angle which varies with the rotational position of the moving coil 16.

The reflected beam is directed toward a cylindrical type of collimating lens 32. As the mirror is rotated by angular deflection of the moving coil 16, the reflected light from the mirror 30 is caused to scan over the extent of the collimating lens 32.

Located behind the collimating lens 32 is a filter 34, for example, which is used to split the beam passing through the collimating lens 32 in two directions. The light of the longer wavelengths, i.e., in the red region of the spectrum, passes through the filter 34, while light of the shorter wavelengths, i.e., the near ultraviolet, is reflected by the filter 34. The surface of the filter 34 is inclined at an angle so that the reflected beam is directed downwardly where it focuses on the surface of the recording medium, indicated at 36. The recording medium may be any suitable well known recording paper which is sensitive to light in the near ultraviolet region so that a visual image can be formed on the recording medium indicating the path traversed by the incident light beam. The recording medium is carried in the form of a roll on a shaft 38 and is withdrawn at a constant rate by means of a drive motor 40 which drives a pair of drive wheels 42 and 44 that engage the surface of the recording medium. The manner in which the recording medium is fed through the oscillograph is well known and therefore will not be described in more detail.

The collimated beam from the mirror 30 after passing through the filter 34 forms a spot of light on the surface of an electro-optical potentiometer element 46. The potentiometer element 46 is elongated, having a length coextensive with the width of the recording medium 36. Thus, as the beam is scanned across the width of the recording medium, it is also scanned over the length of the potentiometer element 46.

The electro-optical potentiometer element is shown in more detail in FIGURE 2. It includes a backing or substrate 48 of insulating material such as ceramic or plastic. The substrate 48 is overlaid with a layer of nichrome or other suitable resistance material. The nichrome layer is then etched away to form two separate elements 50 and 52. The elements 50 and 52 are in the form of combs having interlacing teeth, indicated at 54 and 56 respectively, which are separated from each other so that the elements 50 and 52 are electrically isolated. The teeth 54 of the element 50 as well as the entire element 52 are then plated with gold to provide an inert low resistance conducting surface. Leads are connected to the element 50 at terminals 58 and 60, the unplated portion of the element 50 providing a relatively high resistance conductive path between the terminals 58 and 60 through the nichrome material. The terminal 62 provides a third connection to the potentiometer element 46, the terminal 62 providing a low resistance connection to the teeth 56 of element 52.

The central area of the strip formed by the interlacing teeth of the elements 50 and 52 is overlaid with a thin layer of photoconductive material, such as, for example, cadmium sulphide or cadmium selenide. The photoconductive layer is indicated by the shaded strip 64 in FIGURE 2. It is made only a few wavelengths thick so that the incident light penetrates the full thickness of the photoconductive layer.

In operation, when the collimated beam falls on the surface of the electro-optical potentiometer 46, as indicated at 66 in FIGURE 1, the resistance of the illuminated area of the photoconducting layer 64 is greatly reduced, providing a relatively low resistance current conducting path between the elements 50 and 52 at the position of the beam 66.

Referring again to FIGURE 1, a potential provided by a battery 68 or other suitable isolated regulated D.C. power supply is connected across the terminals 58 and 60 of the resistance element 50 of the electro-optical potentiometer 46. This provides a voltage gradient across the length of the resistance element 50. The voltage at the terminal 62 thus is determined by the position of the beam in relation to the potential gradient provided along the length of the element 50. A conventional potentiometer 70 is connected across the potential source 68 with the variable tap of the potentiometer 70 being connected to ground reference potential.

The terminal 62 of the electro-optical potentiometer 46 is connected to one input terminal of the differential amplifier 28. The input voltage to be measured is connected to the other input terminal of the differential amplifier 28 and to the ground reference potential. Thus, the differential amplifier 28 amplifies whatever difference voltage exists between the input signal and the voltage derived from the potentiometer 46. The zero setting is adjusted by the potentiometer 70 so that with zero input signal, the position of the beam along the length of the electro-optical potentiometer 46 can be adjusted to correspond to zero position on the recording strip. Normally the potentiometer 70 would be adjusted so that the beam would be in the center position of the recording strip 36. As the input voltage varies in either polarity an output signal is derived from the differential amplifier 28 which actuates the galvanometer 12 to deflect the beam. The beam is moved along the extent of the electro-optical potentiometer 46 to a position in which the voltage at the output terminal 62 substantially balances out the input voltage being measured. Thus, assuming a high gain for the amplifier 28, the position of the beam along the length of the electro-optical potentiometer 46 and hence along the width of the recording chart 36 is always proportional to the instantaneous amplitude of the input signal being measured. The positioning of the beam thus is independent of the linearity of the galvanometer itself permitting a relatively inexpensive galvanometer unit to be used.

What is claimed is:

1. A recording system for producing a visual record of variations in amplitude of an input voltage comprising a galvanometer having a moving coil element, a mirror mounted on the moving coil element, means for illuminating the mirror, an electro-optical potentiometer unit including a resistance element, a conductive element, and photosensitive material responsive to light for making a lower resistance path between the conductive element and the resistance element at the point of an impinging light beam, means for applying a fixed voltage across the resistance element, means for driving the galvanometer in response to the voltage difference between the input voltage and the voltage derived from the conductive element of the electro-optical potentiometer unit, means for focusing a portion of the light reflected by the mirror in a narrow beam position to scan the photosensitive material of the potentiometer with rotation of the mirror, means for driving a continuous strip of recording medium sensitive to light from the means for illuminating, and means for directing a portion of the light reflected from the mirror in a narrow beam onto the recording medium.

2. A recording system for producing a visual record of variations in amplitude of an input voltage comprising a galvanometer having a moving coil element, a source of light, an electro-optical potentiometer unit including a resistance element, a conductive element, and photosensitive material responsive to light for making a lower resistance path between the conductive element and the resistance element at the point of an impinging light beam, means responsive to angular movement of the moving coil for scanning a light beam from the source along the extent of the photosensitive material, means for applying a fixed voltage across the resistance element, means for driving the galvanometer in response to the voltage difference between the input voltage and the voltage derived from the conductive element of the electro-optical potentiometer unit, means for driving a continuous strip of recording medium sensitive to light from the source, and means for directing the scanning light beam simultaneously onto the recording medium and the photosensitive material of the electro-optical potentiometer.

3. A recording system for producing a visual record of variations in amplitude of an input voltage comprising a galvanometer having a moving coil element, a source of light, means including an elongated layer of photosensitive material for producing an output voltage proportional to the position at which an incident light beam falls along the length of the photosensitive material, means responsive to angular movement of the moving coil for scanning a light beam from the source along the extent of the photosensitive material, means for driving the galvanometer in response to the voltage difference between the input voltage and the voltage derived from the photosensitive means, means for driving a continuous strip of recording medium sensitive to light from the source, and means for directing the scanning light beam simultaneously onto the recording medium and the photosensitive material.

References Cited by the Examiner

UNITED STATES PATENTS

| | | | |
|---|---|---|---|
| 2,640,866 | 6/1953 | Powell | 250—230 X |
| 2,693,990 | 11/1954 | Fink | 346—32 |
| 2,889,503 | 6/1959 | Chambers | 346—32 X |
| 3,142,528 | 7/1964 | Stafford et al. | 346—109 |
| 3,144,637 | 8/1964 | Adams et al. | 346—108 X |
| 3,192,393 | 6/1965 | Brodersen | 250—230 X |

RICHARD B. WILKINSON, *Primary Examiner.*

STEPHEN J. TOMSKY, *Examiner.*

J. W. HARTARY, *Assistant Examiner.*